United States Patent
Christie

(10) Patent No.: US 10,589,770 B1
(45) Date of Patent: Mar. 17, 2020

(54) FIXTURE SECURING SYSTEM AND METHOD OF USE

(71) Applicant: Christie Lites Enterprises Canada Inc., Toronto, Ontario (CA)

(72) Inventor: Huntly Gordon Christie, Orlando, FL (US)

(73) Assignee: Christie Lites Enterprises Canada Inc., Toronto (CA)

( * ) Notice: Subject to any disclaimer, the term of this patent is extended or adjusted under 35 U.S.C. 154(b) by 0 days.

(21) Appl. No.: 16/123,491

(22) Filed: Sep. 6, 2018

(51) Int. Cl.
| | |
|---|---|
| *B62B 3/04* | (2006.01) |
| *B62B 3/10* | (2006.01) |
| *F21W 131/406* | (2006.01) |
| *F21V 21/088* | (2006.01) |

(52) U.S. Cl.
CPC .................. *B62B 3/04* (2013.01); *B62B 3/10* (2013.01); *B62B 2203/02* (2013.01); *F21V 21/088* (2013.01); *F21W 2131/406* (2013.01)

(58) Field of Classification Search
CPC .......... B42F 15/06; B42F 15/066; B62B 3/04; B62B 3/10; B62B 2203/02; F21V 21/088; F21W 2131/406; A47F 3/002; A47F 7/024; A47F 7/143; A47F 7/16; A47F 7/163; E05B 69/00; E05B 69/006; E05B 73/00
USPC .......... 211/4, 6, 7, 45, 189, 123, 124, 89.01, 211/13.1, 26.2; 280/79.3
See application file for complete search history.

(56) References Cited

U.S. PATENT DOCUMENTS

| | | | | |
|---|---|---|---|---|
| 531,496 | A * | 12/1894 | Barwick ................ | B42D 5/005 281/19.1 |
| 843,387 | A * | 2/1907 | Blackman ............... | A47F 7/163 211/45 |
| 1,029,493 | A * | 6/1912 | De Dontney ......... | E05B 69/006 211/7 |
| 1,147,019 | A * | 7/1915 | Henry .................... | E05B 69/006 211/7 |
| 1,206,769 | A * | 11/1916 | Wheary ................ | E05B 69/006 211/7 |
| 1,218,980 | A * | 3/1917 | Callahan ............... | E05B 69/006 211/7 |
| 1,229,663 | A * | 6/1917 | Schwartz .............. | E05B 69/006 211/7 |

(Continued)

FOREIGN PATENT DOCUMENTS

| | | |
|---|---|---|
| GB | 2482512 | 2/2012 |
| KR | 101384808 | 4/2014 |

OTHER PUBLICATIONS

Search Report issued in Application No. GB1912744.8 dated Dec. 9, 2019.

*Primary Examiner* — Jennifer E. Novosad
(74) *Attorney, Agent, or Firm* — DLA Piper LLP (US)

(57) ABSTRACT

A system for securing at least one fixture for transport or storage is described. The system comprises at least one rod from which the at least one fixture may be hung by an associated clamp that is attached to the top of the fixture. A locking bar associated with each of the at least one rod is provided, along with a locking mechanism, which may be actuated by a worker to move the locking bar between an open and a closed position. When the locking bar is in the closed position, it secures all clamps to the at least one rod simultaneously. When the locking bar is in an open position, any hung fixtures are released and can be removed from the rod. Described also is a method for securing a fixture.

16 Claims, 3 Drawing Sheets

(56) References Cited

U.S. PATENT DOCUMENTS

| | | | | |
|---|---|---|---|---|
| 1,233,576 | A * | 7/1917 | Higgins | E05B 69/006 211/7 |
| 1,305,179 | A * | 5/1919 | Thomas | E05B 69/006 211/7 |
| 1,324,180 | A * | 12/1919 | Shupp | E05B 69/006 211/7 |
| 1,342,274 | A * | 6/1920 | Clark | E05B 69/00 211/7 |
| 1,355,604 | A * | 10/1920 | Hubert | E05B 69/00 211/7 |
| 1,602,341 | A * | 10/1926 | Day | B42F 15/066 40/658 |
| 1,723,526 | A * | 8/1929 | Sanderson | A47F 7/04 211/4 |
| 2,588,110 | A * | 3/1952 | Halliday | A47F 1/04 211/4 |
| 2,616,133 | A * | 11/1952 | Peters | E06B 7/34 211/4 |
| 2,953,251 | A * | 9/1960 | Stone | A47J 47/16 211/4 |
| 3,438,506 | A * | 4/1969 | Groth | A47F 5/01 211/4 |
| 3,567,034 | A * | 3/1971 | Mozelsio | A47G 25/0692 211/7 |
| 3,610,423 | A * | 10/1971 | Parillo | A47F 7/24 211/7 |
| 3,613,898 | A * | 10/1971 | Brennan | B65D 85/185 211/124 |
| 3,690,130 | A * | 9/1972 | Eutzler | E05B 69/006 70/18 |
| 3,738,550 | A * | 6/1973 | Van Etta et al. | A47G 25/52 223/85 |
| 3,831,892 | A * | 8/1974 | Herman | B60R 11/06 248/201 |
| 4,036,366 | A * | 7/1977 | Dixon | A22C 15/007 211/4 |
| 4,079,840 | A * | 3/1978 | Usner | A47F 7/19 211/124 |
| 4,155,458 | A * | 5/1979 | Moline | B25H 3/04 211/4 |
| 4,262,808 | A * | 4/1981 | Laporte | B42F 15/063 211/46 |
| 4,293,076 | A * | 10/1981 | Collin | B65D 85/185 206/289 |
| 4,336,885 | A * | 6/1982 | Thomas | A47F 7/024 211/4 |
| 4,474,300 | A * | 10/1984 | Entis | A47F 5/0861 211/4 |
| 4,489,836 | A * | 12/1984 | Terrell | B42F 15/0094 211/45 |
| 4,733,781 | A * | 3/1988 | Gerlach | B65D 19/44 206/448 |
| 4,948,202 | A * | 8/1990 | Helseth | A47F 3/00 211/45 |
| 5,092,473 | A * | 3/1992 | Zelniker | A47F 7/24 211/124 |
| 5,160,048 | A * | 11/1992 | Leyden | A47F 7/24 211/7 |
| 5,306,109 | A | 4/1994 | Kreuzer et al. | |
| 5,330,058 | A * | 7/1994 | Rice | A47F 5/01 211/189 |
| 5,332,105 | A * | 7/1994 | Stanfield | A47L 15/503 211/4 |
| 5,647,489 | A * | 7/1997 | Bellis, Jr. | A47B 81/005 211/208 |
| 5,785,184 | A * | 7/1998 | Metselaar | E05B 69/006 211/168 |
| 5,823,358 | A * | 10/1998 | Leyden | A47F 5/0861 211/8 |
| 5,995,003 | A * | 11/1999 | Rogers | G08B 13/1463 340/568.1 |
| 6,173,842 | B1 * | 1/2001 | Fitzgerald | B60R 9/00 211/4 |
| 6,223,915 | B1 * | 5/2001 | Waner | A47F 7/19 211/124 |
| 6,390,307 | B1 * | 5/2002 | Stelter | A63B 61/02 211/60.1 |
| 6,464,092 | B1 * | 10/2002 | Kortman | A47B 46/00 211/162 |
| 6,799,523 | B1 * | 10/2004 | Cunha | A47F 5/0093 108/108 |
| 7,104,094 | B2 * | 9/2006 | Zadak | A47F 5/0861 211/4 |
| 7,219,464 | B1 * | 5/2007 | Kujawa | A01K 97/08 211/70.8 |
| 7,850,013 | B1 * | 12/2010 | Kramer | E05B 73/0082 211/26 |
| 8,387,808 | B2 * | 3/2013 | Radowski | A47G 25/1464 211/123 |
| 8,800,785 | B2 * | 8/2014 | Kalafut | A47F 5/0861 211/103 |
| 9,714,738 | B1 | 7/2017 | Brown | |
| 10,219,619 | B1 * | 3/2019 | Smith | E05B 69/006 |
| 10,244,865 | B1 * | 4/2019 | Chauhan | A47B 61/003 |
| 2002/0113030 | A1 | 8/2002 | Belisle | A47B 81/005 211/85.7 |
| 2004/0155000 | A1 * | 8/2004 | Mele | A47F 7/0028 211/4 |
| 2005/0133470 | A1 * | 6/2005 | Kin | A47F 7/16 211/45 |
| 2008/0023418 | A1 * | 1/2008 | Robbins | A47F 5/0807 211/45 |
| 2009/0016046 | A1 * | 1/2009 | Witsenburg | A47F 11/10 362/145 |
| 2015/0167356 | A1 * | 6/2015 | Leyden | E05B 73/0017 223/85 |
| 2016/0015190 | A1 * | 1/2016 | White | A47F 7/24 211/113 |
| 2016/0348300 | A1 * | 12/2016 | Hanna | D06F 57/12 |

\* cited by examiner

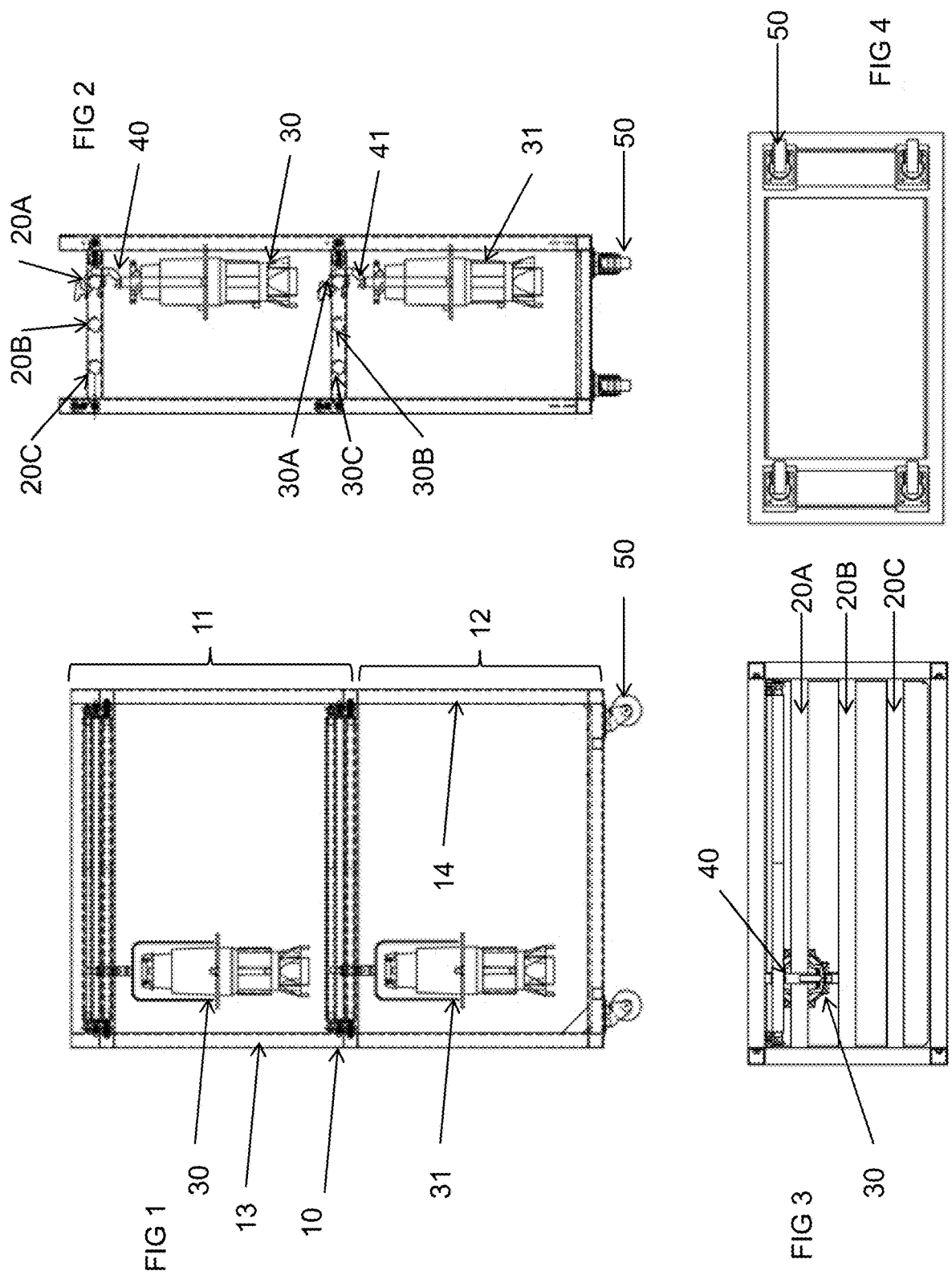

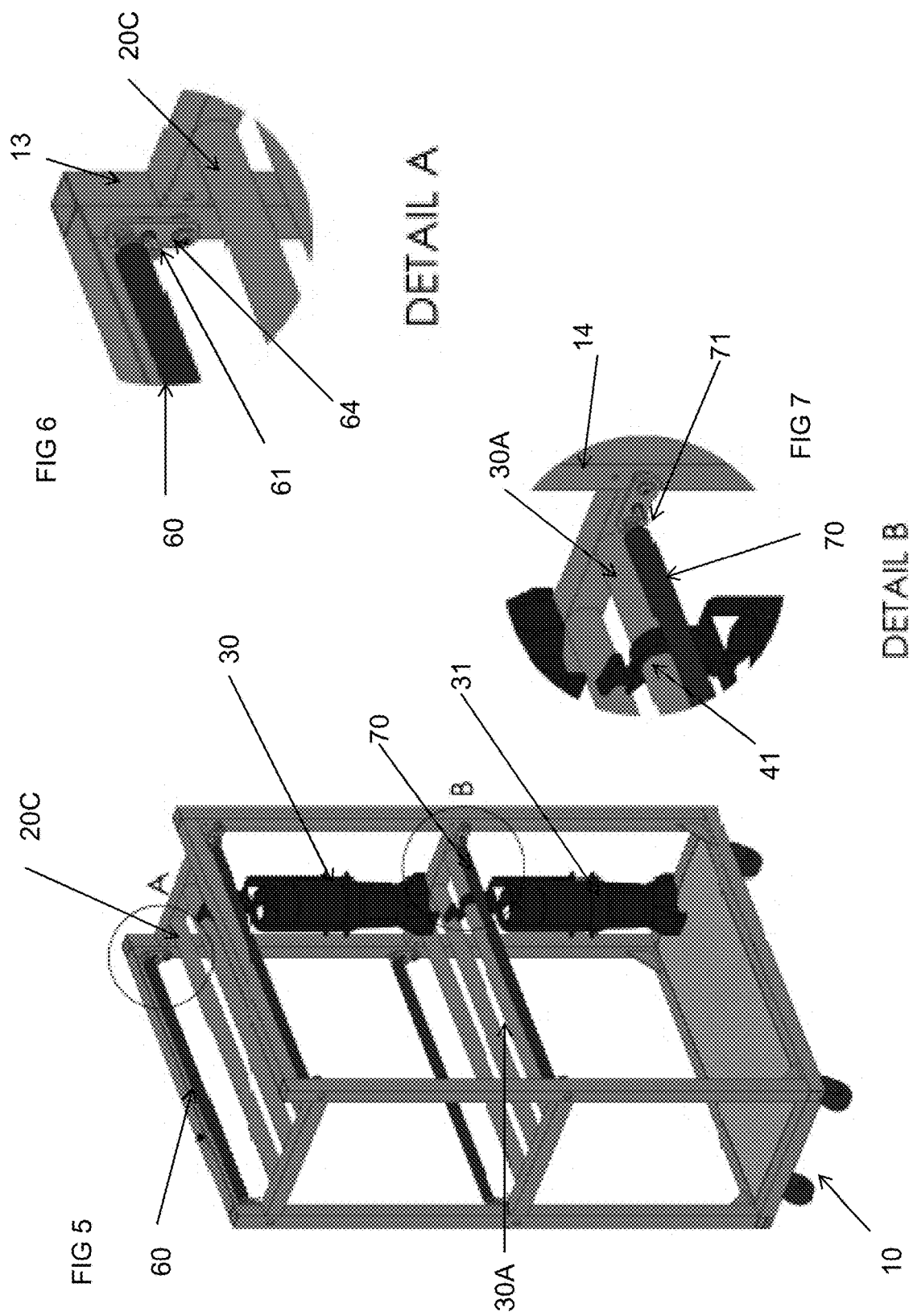

FIXTURE SECURING SYSTEM AND METHOD OF USE

TECHNICAL FIELD

The present disclosure relates generally to a device for securing fixtures for transport or storage and, more specifically, it relates to a device that allows for the rapid and secure locking and unlocking of fixtures to a moveable dolly or storage rack.

TECHNICAL BACKGROUND

Fixtures, such as light fixtures, are used in staging, for example, to illuminate theatre productions, concerts, trade shows, and corporate events. Stage lighting is also a mainstay of the film industry, where it is similarly used to illuminate sets when filming scenes for movies or television shows. Stage lighting usually comprises a truss network or scaffolding from which light fixtures may be securely hung at elevation to light a space.

Fixtures, including light fixtures, are generally bulky and heavy. As such, a dolly or case is normally used to transport light fixtures between locations, for example, to and from storage or to and from a set. The dolly usually comprises a set of elevated rods or pipes, running the length of the dolly, from which light fixtures can be hung by a worker or workers. Each light fixture is hung from one of the dolly's rods or pipes and must be locked in place to secure it during transport. A clamp, which may generally utilize a threaded bolt, is used to secure each light fixture to the dolly's rod or pipe.

Light fixtures are similarly stored by hanging the fixtures from rods or pipes running the length of a storage rack. Clamps, also generally utilizing a threaded bolt, are used to secure the light fixtures to the pipes or rods on the storage rack for safe storage.

However, the process of hanging each light fixture from a rod or pipe and securing each, clamp by clamp, is both tedious and time consuming. Each clamp generally requires individual hand tightening using a twisting handle, or activation of a similar mechanism, by a worker to create a secure grip. Time that could be used building or dismantling a concert stage, for example, must instead be spent securely clamping each light fixture in place.

SUMMARY

A dolly and a storage rack each comprise at least one rod from which a worker may hang multiple fixtures using individual clamps. The worker may then secure all such hanging fixtures to that rod at the same time and in one simple movement, thereby increasing efficiency and decreasing the overall time spent on the activity.

Provided is a dolly and storage rack that includes a locking bar corresponding to each rod and moveable with respect to each rod as between an open position and a closed position. Each fixture also has an associated clamp. A worker first hangs each fixture from the rod of the dolly or storage rack by its associated clamp. Each clamp is first in an open position so that it may be placed around the rod. In this open position the clamps are not securely affixing the fixture to the rod.

Instead of manually closing and tightening the arms of each clamp around each rod, a worker need only actuate a locking mechanism to move the locking bar to a closed position thereby causing all clamps to be simultaneously engaged by the locking bar. Hand tightening of each clamp by a worker or workers is no longer required as the force of the locking bar keeps the clamps secured.

When fixtures need to be removed from the dolly or storage rack, a worker simply releases the locking mechanism, which releases the locking bar and causes it to move from a closed position to an open position. Moving the locking bar from a closed position to an open position releases the clamps so that the fixtures can be removed from the rod. The worker may then remove some or all of the light fixtures as needed, quickly and efficiently.

BRIEF DESCRIPTION OF THE DRAWINGS

The following drawings illustrate, by way of example only, embodiments of the present disclosure, in which like reference numerals describe similar items throughout the various drawings.

FIG. 1 is a side view of one embodiment, including attached light fixtures.

FIG. 2 is a front view of one embodiment, including attached light fixtures.

FIG. 3 is a top view of one embodiment, including an attached light fixtures.

FIG. 4 is a bottom view of one embodiment.

FIG. 5 is an is isometric view of one embodiment, including attached light fixtures.

FIG. 6 is an enlarged isometric view of a detail of the embodiment of FIG. 5.

FIG. 7 is an enlarged isometric view of a detail of one embodiment of FIG. 5.

DETAILED DESCRIPTION

Figure 8:
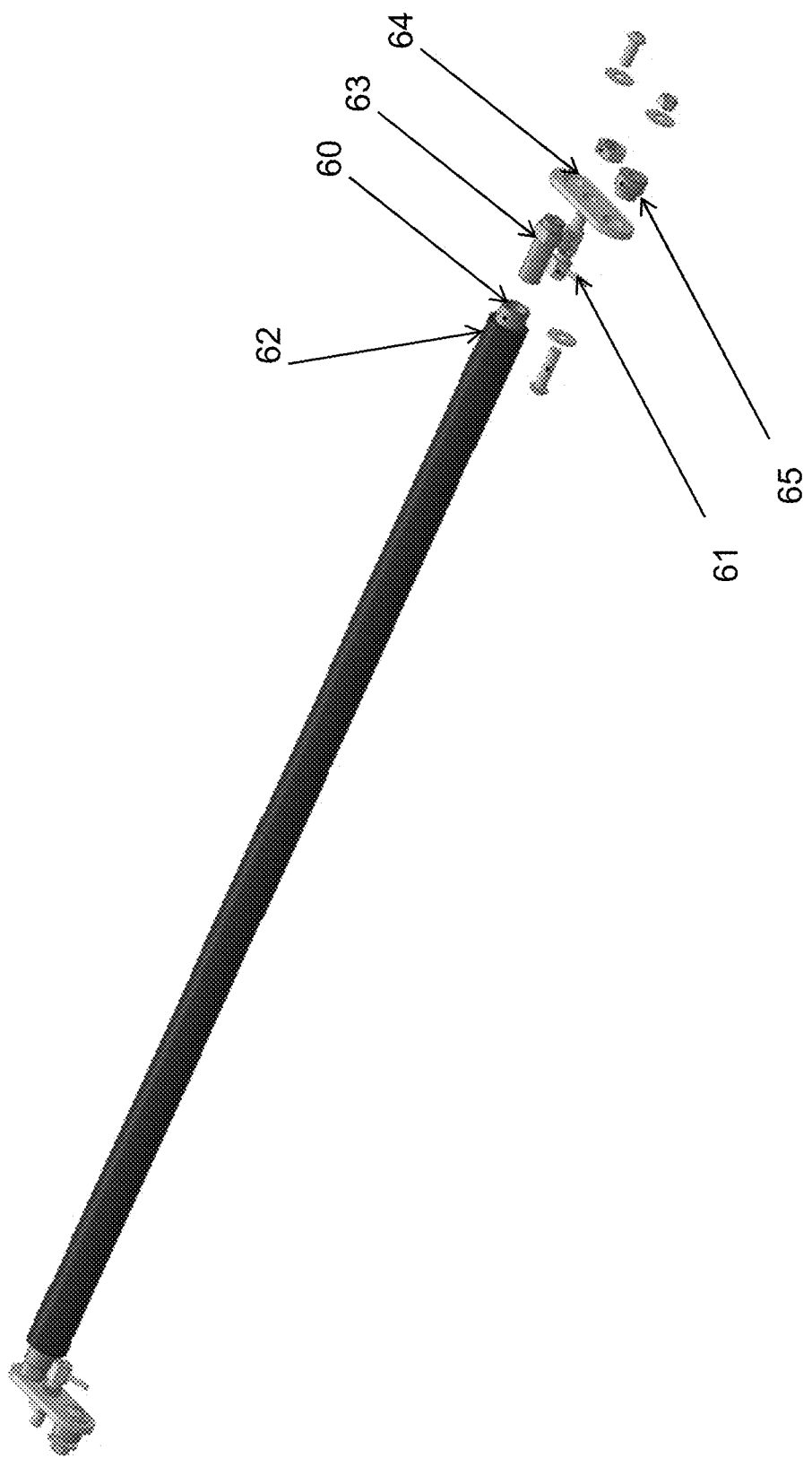
FIG. 8 is an exploded isometric view of a locking rod for use with one embodiment.

A detailed description of the embodiments will be given in the following. It will be appreciated that the figures provided herein are for illustration only and are not meant to be restrictive. Any references to directions, such as "up" or "down", "top" or "bottom", are exemplary and refer only to the directions shown in the figures.

With reference to FIG. 1, provided is a transport dolly 10. The dolly 10 may be approximately 2 metres in height, although different heights may also be used and are contemplated herein. As shown in FIG. 1, the dolly 10 comprises multiple distinct but substantively identical portions, a top portion 11 and a bottom portion 12, each capable of accommodating hanging fixtures. A dolly with a single portion may also be used. With reference to the figures, the fixtures may include a light fixture 30 hanging in the upper portion 11 and a light fixture 31 hanging in the lower portion 12. Each portion, 11 and 12, may be a sufficient height to accommodate a hanging fixture. There may be more than two portions provided. However, depending on the size of the dolly and the weight of the fixtures, additional or excessive dolly height may increase the risk of the dolly tipping over or falling. With reference to FIG. 1, there are two portions 11 and 12, each with an associated frame 13 and 14 and each portion being about 80 cm in height although, again, other heights may be used.

In one embodiment, the dolly 10 is about 1.2 m in length and about 60 cm in width. The dolly 10 may be any width and length so long as the length and width are such that they allow an individual worker or pair of workers to easily move the dolly around a warehouse or work site. The dolly's width may also correspond to its height in such a manner that it does not create a tipping hazard.

With reference to FIG. 2 and FIG. 3, the dolly may have three upper rods 20A, 20B, 20C, running the length of the top of the upper portion 11 of the dolly 10 and, similarly, the dolly may have lower rods 30A, 30B, 30C running the length of the top of the lower portion 12 of the dolly 10. In one embodiment, the upper rods 20A, 20B, 20C and the lower rods 30A, 30B, 30C are spaced at least 15 cm apart from each other. In this configuration, multiple fixtures may be hung side by side from the outer rods, 20A, 20C, 30A, 30C as those rods are spaced far enough apart from each other—i.e. 20A from 20C and 30A from 30C—to reduce the risk of the fixtures interfering with each other and causing damage to each other if the fixtures were to swing side to side and collide while the dolly 10 is in motion. Larger or heavier light fixtures, or other large and bulky objects, may be hung from central rods 20B and 30B. If large objects or light fixtures are hung from the central rods 20B, 30B such objects may limit the space available to hang light fixtures from the outer rods. In such case, the outer rods may remain unused while a large object is being transported, or the dolly may be made wider to accommodate the large object. Alternatively, the objects may be hung in a staggered, or zigzag pattern. It should also be noted that hanging larger or heavier objects from outer rods 20A, 20C, 30A, 30C may increase the risk of the dolly tipping over, particularly as it is loaded or unloaded.

With reference to FIG. 2, fixtures 30, 31 may be hung from rods 20A, 30A respectively by associated clamps 40, 41. The clamps 40 and 41 may be of the quick-release variety, or may utilize a threaded bolt, and are hand operable by a worker, such as trigger clamps offered by the applicant. Other items to be hung on the dolly may be hung by similar clamps, with the clamps chosen to be strong enough to hang the associated fixture without breaking. With reference to FIG. 2, the clamps may be in an open position when fixtures or objects are hung on the rods. When the clamps are in an open position, the light fixtures 30 and 31 or objects are not secured to rods 20A, 30A of the dolly 10.

Although one embodiment comprises three rods running the length of each portion of dolly 10, any number of rods may be used. For example, rods 20A, 20C, 30A, 30C need not be present on the dolly 10, and only central rods 20B and 30B need be present. Alternatively, rods 20B and 30B need not be present leaving rods 20A, 20C, 30A, 30C in place. Additional rods may also be included and each portion of the dolly 10 may comprise four, five or more such rods. In any case, the rods may be made from a rigid material, preferably a seamless steel bar. The bar is preferably sufficiently stiff to not deform or bend under the weight of hanging fixtures and objects.

With reference to FIGS. 1, 2, and 4, mobility for the dolly 10 may be provided by a set of wheels attached under its base, which are generally of the caster 50 variety. The casters 50 allow the dolly 10 to be moved about a warehouse or worksite with ease by a worker or pair of workers. The casters 50 must be sufficiently strong to allow loading of the light fixtures and potentially other heavy and bulky items while retaining structural integrity. An alternative arrangement of wheels may be used, such as fixed wheels. Wheels may also only be present at one end of the dolly 10 with fixed supports at the other end of dolly 10. Alternatively, the dolly 10 may not have wheels such that the dolly 10 may be transported using an external means, such as with a fork lift.

With reference to FIG. 5, provided on the dolly 10 may be one or more locking bars, each associated with a corresponding rod. With reference to FIG. 5, shown is a locking bar 60 corresponding with rod 20C and locking bar 70 corresponding with rod 30A. For ease of description only locking bars 60 and 70 and the locking mechanism associated therewith shall be described herein. However, it should be understood that the locking mechanism described in association with the locking bars 60 and 70 and rods 20C and 30A may apply to other rods on the dolly 10.

FIG. 6 represents a locking bar 60 in an example open position while FIG. 7 represents a locking bar 70 in an example closed position. Locking bar 60 may be transitioned from its illustrative open position to a closed position and locking bar 70 may be transitioned from its illustrative closed position to an open position. Transitioning a locking bar, whether 60 or 70, from an open position to a closed position may involve operating a locking mechanism that maintains the locking bar in the open and/or closed position. Releasing a locking mechanism may allow the locking bar to swing toward, or otherwise move toward, or move away, from its associated rod, 20C or 30A.

In one instance of a locking mechanism, provided at one or both ends of each locking bar 60, 70 may be spring loaded plungers 61 and 71 that can be actuated by an operator to lock each locking bar 60, 70 into an open or closed position. The locking bar 60 may be attached at each end to a rotatable arm 64. The rotatable arm 64 may be attached to the frame at a pivot point and capable of rotating about the pivot point. Alternatively, the locking bar 60 may be attached to a mechanism, such as a rail system, that allows the locking bar to move up and down, with respect to its associated rod, without rotation, when the locking mechanism is actuated.

With reference to FIG. 6, a spring loaded plunger 61 may attach to the rotatable arm 64 and pass through the rotatable arm 64. One end of the plunger 61 may sit within a corresponding first hole or first space in the frame 13 of the upper portion 11 of the dolly 10. The plunger 61 may be biased by a spring so that the plunger 61 is maintained within the corresponding hole or space. In an exemplary closing operation, an operator may remove the spring-loaded plunger 61 from the first hole or space by countering the biasing spring within the plunger, and then rotate the arm 64 around a pivot point so that the locking bar 60 moves towards rod 20C. Alternatively, an operator may actuate a locking mechanism that allows the locking bar 60 to drop down, for example along a rail system, onto the rod 60 without rotation.

Any clamp that is in an open position on the rod 20C will be acted upon by the force of rod 20C bearing on it, pinning an arm of the clamp to the rod. In such a manner, an operator may securely pin multiple clamps to a rod in one simple motion. The locking bar 60 may then be secured in place when the operator releases the associated spring-loaded plunger 61, and the bias spring, now released, causes one end of the spring-loaded plunger 61 to plunge into a second associated hole or space in the frame of the dolly 10. This locked position of the locking bar can best be seen in FIG. 7 where one end of plunger 71 is located in its second associated hole. As can also be seen in FIG. 7, locking rod 70 is shown bearing down on clamp 41, pinning its arm against rod 30A. A similar locking position may be obtained if the locking 70 is dropped down from a rail system.

With further reference to FIG. 7, in an exemplary opening operation, an operator pulls plunger 71 from its second associated hole, countering the force of the bias spring, and swings locking bar 70 up and away from its corresponding rod 30A. Moving locking bar 70 away from rod 30A releases the force acting on any arms corresponding to the clamps positioned on rod 30A, thereby unpinning and releasing them. The operator then releases the spring-loaded plunger 71, causing the biasing spring to release and causing the spring-loaded plunger 71 to plunge into the first associated hole or space in the frame 14 of the dolly 10. In this manner, the operator may release multiple clamps in one simple motion and may thereafter begin removing hanging light fixtures. Alternatively, the operator may lift the locking bar 70 up and along a rail system for example instead of swinging or rotating it away from the associated rod 30A.

If multiple locking mechanisms are present, such as at each end of the locking bar 60, 70, for example, a worker may need to actuate each such locking mechanisms to move the locking bar from an open position to a closed position and from a closed position to an open position. In such an embodiment, each locking mechanism may work in the manner described above. If multiple locking mechanisms are used, each of the mechanisms may need to be operated separately, or the mechanisms may be interconnected, by for example as using a lever arm, pin, rod or wire so that an operator activing one locking mechanism, also mechanically activates a second locking mechanism.

Clamps and clamp arms used to affix lights or other objects to the rods of a dolly 10 need not be uniform and may instead be of varying sizes and still work with the locking bar. A deformable coating may be applied to the outer surface of each locking rod, allowing for some compression to occur around larger clamps. In such an embodiment, the large clamps cause the deformable coating of the locking bar to indent, allowing the coating to deform around them, thereby allowing any remaining and non-deformed coating on the rod to contact and secure the smaller clamps. The coating may be a soft rubber coating, a vinyl foam cushion, or any similar coating that is capable of deformation.

The coating applied to a locking bar may also help protect clamps, and the rods to which they are attached, as it keeps the clamps secured tightly in place and prevents them from bouncing along, or up and down, on the rods as the dolly 10 is moved. Further, the coating may help absorb vibrations as the dolly 10 is moved. Absorbing vibrations also helps prevent the locking bar from accidently opening if the dolly 10 is required to be moved across bumpy terrain and it experiences any large shocks. The coating may also protect the clamps from being scratched or damaged by the locking bar.

With reference now to FIG. 8, provided is one embodiment of a locking bar 60, which may be coated by a vinyl cushion 62. Each end of the locking bar 60 may be provided with a locking mechanism, however, for the sake of ease of description, only one such mechanism will be described in detail. The locking mechanism may comprise a spring-loaded plunger 61, which is capable of locking the locking bar in either a closed or open position. A spring in the spring-loaded plunger 61 may bias a pin to extend into a corresponding receiving hole as described above. A spigot 63 may be used to allow the locking bar 60 to rotate. The locking bar 60 may be attached to the frame of a corresponding dolly by a rotatable arm 64, as described above. A spacer 65 may be included to allow the arm to rotate from a closed position to an open position, and from an open position to a closed position, without snagging on the frame. The locking bar 60 may be fixed to the arm 64. Similarly the arm 64 may be attached to the frame so that the arm 64 can rotate about the pivot point and allowing the locking bar 60 to trace an arc as the arm 64 rotates.

In an alternative embodiment of the present invention, the locking bar 60 may be biased so that it swings or drops towards its corresponding rod 20C when not restrained, such as by a spring-loaded plunger or within a rail system. In this embodiment, an operator need not manually move the locking bar 60 down or swing it towards rod 20C as the biasing mechanism, which may comprise a weight, itself will cause the movement to occur. This embodiment may be suited for use when the clamps that are being used to affix the fixtures, or other objects, are sufficiently large so as to prevent the locking bar 60 from dropping or swinging and getting close enough to its corresponding rod 20C to allow the spring loaded plunger to reach a second associated hole or space in the frame.

In this embodiment, to open the locking bar 60, a worker may simply exert a force on the locking bar 60 that is greater than the biasing force. Exerting such a force will allow the worker to lift or swing the locking bar 60 away from its corresponding rod 20C. Once the locking bar is lifted or swung away, any clamps held pinned to their corresponding rods by the locking bar 60 will be released. The spring-loaded plunger 61 may secure the locking bar 60 in the open position when the plunger is driven back into a corresponding hole or space in the frame by the decompression of its associated spring.

In an embodiment, there may be more than two holes for the plunger, such that an available hole may be used to lock the locking bar in position depending on how open or closed the locking bar is.

Although the present invention has been described above as used with a moveable dolly, the same locking system and rods may be used with a fixed storage rack. Similar to a dolly, a storage rack may comprise one or more rods. Some or all such rods may have a corresponding locking bar as described above.

While the dolly has been described with reference to rods and locking bars, the rods and locking bars may have any suitable shape having sufficient structural strength to support the fixtures and hold them in position. Preferably, the rods and locking bar are pipes, although sold cylindrical shapes, hollow or solid square, triangular, or L-shapes may be used. Alternatively, the rod and locking bar may be formed so as to be able to mate with each other. The rod may also be formed with a lip from which the clamps may be hung and the locking bar may secure the clamps to the lip.

Various embodiments of the present invention have been described above in detail by way of example and it will be apparent to those skilled in the art that variations and modifications may be made without departing from the invention. The invention includes all such variations and modification as fall within the scope of the claims.

The invention claimed is:

1. A securing system to secure at least one fixture, the at least one fixture having a clamp, the securing system comprising:
    a frame;
    at least one rod attached to the frame from which the at least one fixture can be hung using the clamp, wherein the clamp of the at least one fixture is to clamp onto the at least one rod;
    a locking bar associated with each of the at least one rod; and
    at least one locking mechanism attaching the locking bar to the frame,
    wherein the at least one locking mechanism is actuatable to move the locking bar between an open position and a closed position;
    wherein actuating the at least one locking mechanism to move the locking bar from the open position to the closed position causes the locking bar to move towards the associated at least one rod and allows the locking bar to act upon the clamp to pin it securely to the associated at least one rod, wherein actuating the locking mechanism to move the locking bar from the closed position to the open position moves the locking bar away from the associated at least one rod and allows the clamp to be released, and wherein the at least one fixture comprises a light fixture.

2. The securing system of claim 1 further comprising:
a dolly comprising at least one portion,
wherein the at least one portion is integral with the frame of the securing system.

3. The securing system of claim 1 further comprising:
a storage rack comprising at least one portion,
wherein the at least one portion is integral with the frame of the securing system.

4. The securing system of claim 1 wherein the locking mechanism comprises:
a pivot arm connected at a first end to the frame and connected at a second end to the locking bar,
wherein actuating the locking mechanism causes the pivot arm to pivot about the first end thereby causing the locking bar to trace an arc in space as the locking bar moves between the open position and the closed position.

5. The securing system of claim 4 further comprising:
a dolly comprising at least one portion,
wherein the at least one portion is integral with the frame of the securing system.

6. The securing system of claim 4 further comprising:
a storage rack comprising at least one portion,
wherein the at least one portion is integral with the frame of the securing system.

7. The securing system of claim 4 wherein the locking mechanism further comprises:
a plunger attached to the pivot arm and passing through the pivot arm such that one end of the plunger is retained in an association space in the frame; and
wherein actuating the locking mechanism requires pulling the plunger from the associated space in the frame thereby allowing the pivot arm to pivot about the first end.

8. The securing system of claim 7 further comprising:
a dolly comprising at least one portion,
wherein the at least one portion is integral with the frame of the securing system.

9. The securing system of claim 7 further comprising:
a storage rack comprising at least one portion,
wherein the at least one portion is integral with the frame of the securing system.

10. The securing system of claim 4 further comprising a biasing mechanism that exerts a force to keep the locking bar in the closed position.

11. The securing system of claim 1 further comprising a biasing mechanism that exerts a force to keep the locking bar in the closed position.

12. The securing system of claim 1 wherein the locking bar is coated with a deformable coating.

13. The securing system of claim 12 wherein the deformable coating comprises a vinyl cushion.

14. A method of securing a fixture, the fixture having a clamp, comprising:
hanging the fixture from a rod attached to a frame by the clamp, wherein the clamp of the fixture is to clamp onto the rod;
actuating a locking mechanism to release a locking bar from an open position wherein in the open position the locking bar is spaced apart from the rod; and
moving the locking bar toward the rod causing the locking bar to be in a closed position and thereby causing the locking bar to exert a force on the clamp causing the clamp to be pinned to the rod,
wherein the fixture comprises a light fixture.

15. The method of claim 14 wherein actuating the locking mechanism causes a pivot arm connected at a first end to the frame and connected at a second end to the locking bar to pivot about the first end causing the locking bar to trace an arc in space as it moves to the closed position.

16. The method of claim 15 wherein actuating the locking mechanism further comprises:
pulling a plunger attached to the pivot arm that passes through the pivot arm from an associated space in the frame thereby allowing the pivot arm to pivot.

* * * * *